United States Patent
Kariti et al.

(10) Patent No.: US 9,185,347 B2
(45) Date of Patent: *Nov. 10, 2015

(54) VIDEO CONFERENCING OVER IP NETWORKS

(71) Applicant: OOVOO, LLC, New York, NY (US)

(72) Inventors: Eran Kariti, Tel Aviv (IL); Sergey Pesherov, Rishon Lezion (IL); Vladislav Gelfer, Rishon Lezion (IL)

(73) Assignee: OOVOO, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,405

(22) Filed: Oct. 6, 2014

(65) Prior Publication Data

US 2015/0092014 A1 Apr. 2, 2015

Related U.S. Application Data

(63) Continuation of application No. 11/890,382, filed on Aug. 6, 2007, now Pat. No. 8,856,371.

(60) Provisional application No. 60/835,998, filed on Aug. 7, 2006.

(51) Int. Cl.

| | |
|---|---|
| *G06F 15/16* | (2006.01) |
| *H04N 7/15* | (2006.01) |
| *G06Q 10/10* | (2012.01) |
| *H04L 12/24* | (2006.01) |
| *H04M 1/725* | (2006.01) |
| *H04M 3/53* | (2006.01) |
| *H04L 7/00* | (2006.01) |
| *H04L 12/859* | (2013.01) |
| *H04N 5/265* | (2006.01) |

(52) U.S. Cl.
CPC ............... *H04N 7/152* (2013.01); *G06Q 10/10* (2013.01); *H04L 7/0008* (2013.01); *H04L 41/509* (2013.01); *H04L 47/2475* (2013.01); *H04M 1/72547* (2013.01); *H04M 3/5307* (2013.01); *H04N 5/265* (2013.01); *H04M 3/5315* (2013.01)

(58) Field of Classification Search
CPC ............ H04L 41/509; H04M 1/72547; H04M 3/5307; H04M 3/5315
USPC ......................................................... 709/231
See application file for complete search history.

(56) References Cited

U.S. PATENT DOCUMENTS

| | | | | |
|---|---|---|---|---|
| 5,893,126 A | * | 4/1999 | Drews et al. ................... | 715/203 |
| 6,453,336 B1 | * | 9/2002 | Beyda et al. ................... | 709/204 |
| 7,084,898 B1 | * | 8/2006 | Firestone et al. .......... | 348/14.09 |

(Continued)

*Primary Examiner* — Arvin Eskandarnia
(74) *Attorney, Agent, or Firm* — McDermott Will & Emery LLP

(57) ABSTRACT

A method for communication includes establishing communication links over a packet network between a server and plurality of client computers that are to participate in a video teleconference. The server receives from the client computers uplink audio packets and uplink video packets, which respectively contain audio and video data captured by each of the client computers. The server mixes the audio data from the uplink audio packets so as to create respective streams of mixed audio data for transmission to the client computers and transmits to the client computers downlink audio packets containing the respective streams of mixed audio data. The server relays the video data to the client computers in downlink video packets. The client computers receive and synchronize the video data with the mixed audio data.

50 Claims, 10 Drawing Sheets

(56) References Cited

U.S. PATENT DOCUMENTS

| | | |
|---|---|---|
| 7,185,054 B1 * | 2/2007 | Ludwig et al. ............... 709/204 |
| 7,664,057 B1 * | 2/2010 | Wu et al. ...................... 370/260 |
| 2006/0047750 A1 * | 3/2006 | Schmitt et al. ............... 709/204 |
| 2006/0092269 A1 * | 5/2006 | Baird et al. ................. 348/14.08 |
| 2007/0071037 A1 * | 3/2007 | Abraham et al. ............ 370/503 |
| 2007/0299981 A1 * | 12/2007 | Baird ........................... 709/231 |
| 2008/0049947 A1 * | 2/2008 | Yoneda et al. ............... 381/73.1 |

* cited by examiner

| Alice | | | | Bob | | | | Charlie | | | |
|---|---|---|---|---|---|---|---|---|---|---|---|
| Start audio clock time: | 1000 | | | Start audio clock time: | 1100 | | | Start audio clock time: | 1200 | | |
| Start video clock time: | 1100 | | | Start video clock time: | 1150 | | | Start video clock time: | 1240 | | |
| Audio interval: | 20 | | | Audio interval: | 20 | | | Audio interval: | 20 | | |
| Video interval: | 60 | | | Video interval: | 60 | | | Video interval: | 60 | | |
| Audio | | Video | | Audio | | Video | | Audio | | Video | |
| CT | ST | CT | ST | CT | ST | CT | ST | CT | ST | CT | ST |
| 1000 | 0 | 1100 | 0 | 1100 | 0 | 1150 | 0 | 1200 | 0 | 1240 | 0 |
| 1020 | 20 | 1160 | 60 | 1120 | 20 | 1210 | 60 | 1220 | 20 | 1300 | 60 |
| 1040 | 40 | 1220 | 120 | 1140 | 40 | 1270 | 120 | 1240 | 40 | 1360 | 120 |
| 1060 | 60 | 1280 | 180 | 1160 | 60 | 1330 | 180 | 1260 | 60 | 1420 | 180 |
| 1080 | 80 | 1340 | 240 | 1180 | 80 | 1390 | 240 | 1280 | 80 | 1480 | 240 |
| 1100 | 100 | 1400 | 300 | 1200 | 100 | 1450 | 300 | 1300 | 100 | 1540 | 300 |
| 1120 | 120 | 1460 | 360 | 1220 | 120 | 1510 | 360 | 1320 | 120 | 1600 | 360 |
| 1140 | 140 | 1520 | 420 | 1240 | 140 | 1570 | 420 | 1340 | 140 | 1660 | 420 |
| 1160 | 160 | 1580 | 480 | 1260 | 160 | 1630 | 480 | 1360 | 160 | 1720 | 480 |
| 1180 | 180 | 1640 | 540 | 1280 | 180 | 1690 | 540 | 1380 | 180 | 1780 | 540 |
| 1200 | 200 | 1700 | 600 | 1300 | 200 | 1750 | 600 | 1400 | 200 | 1840 | 600 |
| 1220 | 220 | 1760 | 660 | 1320 | 220 | 1810 | 660 | 1420 | 220 | 1900 | 660 |
| 1240 | 240 | 1820 | 720 | 1340 | 240 | 1870 | 720 | 1440 | 240 | 1960 | 720 |
| 1260 | 260 | 1880 | 780 | 1360 | 260 | 1930 | 780 | 1460 | 260 | 2020 | 780 |
| 1280 | 280 | 1940 | 840 | 1380 | 280 | 1990 | 840 | 1480 | 280 | 2080 | 840 |
| 1300 | 300 | 2000 | 900 | 1400 | 300 | 2050 | 900 | 1500 | 300 | 2140 | 900 |
| 1320 | 320 | 2060 | 960 | 1420 | 320 | 2110 | 960 | 1520 | 320 | 2200 | 960 |
| 1340 | 340 | 2120 | 1020 | 1440 | 340 | 2170 | 1020 | 1540 | 340 | 2260 | 1020 |
| 1360 | 360 | 2180 | 1080 | 1460 | 360 | 2230 | 1080 | 1560 | 360 | 2320 | 1080 |
| 1380 | 380 | 2240 | 1140 | 1480 | 380 | 2290 | 1140 | 1580 | 380 | 2380 | 1140 |
| 1400 | 400 | 2300 | 1200 | 1500 | 400 | 2350 | 1200 | 1600 | 400 | 2440 | 1200 |
| 1420 | 420 | 2360 | 1260 | 1520 | 420 | 2410 | 1260 | 1620 | 420 | 2500 | 1260 |
| 1440 | 440 | 2420 | 1320 | 1540 | 440 | 2470 | 1320 | 1640 | 440 | 2560 | 1320 |
| 1460 | 460 | 2480 | 1380 | 1560 | 460 | 2530 | 1380 | 1660 | 460 | 2620 | 1380 |
| 1480 | 480 | 2540 | 1440 | 1580 | 480 | 2590 | 1440 | 1680 | 480 | 2680 | 1440 |
| 1500 | 500 | 2600 | 1500 | 1600 | 500 | 2650 | 1500 | 1700 | 500 | 2740 | 1500 |
| 1520 | 520 | 2660 | 1560 | 1620 | 520 | 2710 | 1560 | 1720 | 520 | 2800 | 1560 |
| 1540 | 540 | 2720 | 1620 | 1640 | 540 | 2770 | 1620 | 1740 | 540 | 2860 | 1620 |
| 1560 | 560 | 2780 | 1680 | 1660 | 560 | 2830 | 1680 | 1760 | 560 | 2920 | 1680 |
| 1580 | 580 | 2840 | 1740 | 1680 | 580 | 2890 | 1740 | 1780 | 580 | 2980 | 1740 |
| 1600 | 600 | 2900 | 1800 | 1700 | 600 | 2950 | 1800 | 1800 | 600 | 3040 | 1800 |
| 1620 | 620 | 2960 | 1860 | 1720 | 620 | 3010 | 1860 | 1820 | 620 | 3100 | 1860 |
| 1640 | 640 | 3020 | 1920 | 1740 | 640 | 3070 | 1920 | 1840 | 640 | 3160 | 1920 |

FIG. 7

| Audio | | | Video | | |
|---|---|---|---|---|---|
| Type | Clock time | Stream time | Type | Clock time | Stream time |
| Sync | 1000 | 0 | Sync | 1100 | 0 |
| Data | | 0 | Data | | 0 |
| Data | | 20 | Data | | 60 |
| Data | | 40 | Data | | 120 |
| Data | | 60 | Data | | 180 |
| Data | | 80 | Data | | 240 |
| Data | | 100 | Data | | 300 |
| Data | | 120 | Data | | 360 |
| Data | | 140 | Data | | 420 |
| Data | | 160 | Data | | 480 |
| Data | | 180 | Data | | 540 |
| Data | | 200 | Data | | 600 |
| Data | | 220 | Data | | 660 |
| Data | | 240 | Data | | 720 |
| Data | | 260 | Data | | 780 |
| Data | | 280 | Data | | 840 |
| Data | | 300 | Data | | 900 |
| Data | | 320 | Data | | 960 |
| Data | | 340 | Sync | 2100 | 1000 |
| Data | | 360 | Data | | 1020 |
| Data | | 380 | Data | | 1080 |
| Data | | 400 | Data | | 1140 |
| Data | | 420 | Data | | 1200 |
| Data | | 440 | Data | | 1260 |
| Data | | 460 | Data | | 1320 |
| Data | | 480 | Data | | 1380 |
| Data | | 500 | Data | | 1440 |
| Data | | 520 | Data | | 1500 |
| Data | | 540 | Data | | 1560 |
| Data | | 560 | Data | | 1620 |
| Data | | 580 | Data | | 1680 |
| Data | | 600 | Data | | 1740 |
| Data | | 620 | Data | | 1800 |
| Data | | 640 | Data | | 1860 |

FIG. 8

| Video | | | | Audio | | | | | |
|---|---|---|---|---|---|---|---|---|---|
| Bob | | | Charlie | | | Data - Mix | | Sync - Bob | Sync - Charlie |
| Type | CT | ST | Type | CT | ST | CT | ST | CT | ST (mix) | CT | ST (mix) |
| Sync | 1150 | 0 | Sync | 1240 | 0 | | 500 | 1100 | 500 | 1200 | 500 |
| Data | | 0 | Data | | 0 | | 540 | 2100 | 1500 | 2200 | 1500 |
| Data | | 60 | Data | | 60 | | 580 | | | | |
| Data | | 120 | Data | | 120 | | 620 | | | | |
| Data | | 180 | Data | | 180 | | 660 | | | | |
| Data | | 240 | Data | | 240 | | 700 | | | | |
| Data | | 300 | Data | | 300 | | 740 | | | | |
| Data | | 360 | Data | | 360 | | 780 | | | | |
| Data | | 420 | Data | | 420 | | 820 | | | | |
| Data | | 480 | Data | | 480 | | 860 | | | | |
| Data | | 540 | Data | | 540 | | 900 | | | | |
| Data | | 600 | Data | | 600 | | 940 | | | | |
| Data | | 660 | Data | | 660 | | 980 | | | | |
| Data | | 720 | Data | | 720 | | 1020 | | | | |
| Data | | 780 | Data | | 780 | | 1060 | | | | |
| Data | | 840 | Data | | 840 | | 1100 | | | | |
| Data | | 900 | Data | | 900 | | 1140 | | | | |
| Data | | 960 | Data | | 960 | | 1180 | | | | |
| Sync | 2150 | 1000 | Sync | 2240 | 1000 | | 1220 | | | | |
| Data | | 1020 | Data | | 1020 | | 1260 | | | | |
| Data | | 1080 | Data | | 1080 | | 1300 | | | | |
| Data | | 1140 | Data | | 1140 | | 1340 | | | | |
| Data | | 1200 | Data | | 1200 | | 1380 | | | | |
| Data | | 1260 | Data | | 1260 | | 1420 | | | | |
| Data | | 1320 | Data | | 1320 | | 1460 | | | | |
| Data | | 1380 | Data | | 1380 | | 1500 | | | | |
| Data | | 1440 | Data | | 1440 | | 1540 | | | | |
| Data | | 1500 | Data | | 1500 | | 1580 | | | | |
| Data | | 1560 | Data | | 1560 | | 1620 | | | | |
| Data | | 1620 | Data | | 1620 | | 1660 | | | | |
| Data | | 1680 | Data | | 1680 | | 1700 | | | | |
| Data | | 1740 | Data | | 1740 | | 1740 | | | | |
| Data | | 1800 | Data | | 1800 | | 1780 | | | | |
| Data | | 1860 | Data | | 1860 | | 1820 | | | | |

FIG. 9

| Audio mix | | | Bob's video | | Charlie's video | |
|---|---|---|---|---|---|---|
| Stream time | Bob clock time | Charlie clock time | Stream time | Clock time | Stream time | Clock time |
| 500 | 1100 | 1200 | 0 | 1100 | 0 | 0 |
| 540 | 1140 | 1240 | 60 | 1160 | 0 | 0 |
| 580 | 1180 | 1280 | 120 | 1220 | 0 | 1200 |
| 620 | 1220 | 1320 | 180 | 1280 | 60 | 1260 |
| 660 | 1260 | 1360 | 240 | 1340 | 120 | 1320 |
| 700 | 1300 | 1400 | 300 | 1400 | 180 | 1380 |
| 740 | 1340 | 1440 | 360 | 1460 | 240 | 1440 |
| 780 | 1380 | 1480 | 420 | 1520 | 300 | 1500 |
| 820 | 1420 | 1520 | 480 | 1580 | 360 | 1560 |
| 860 | 1460 | 1560 | 540 | 1640 | 420 | 1620 |
| 900 | 1500 | 1600 | 600 | 1700 | 480 | 1680 |
| 940 | 1540 | 1640 | 660 | 1760 | 540 | 1740 |
| 980 | 1580 | 1680 | 720 | 1820 | 600 | 1800 |
| 1020 | 1620 | 1720 | 780 | 1880 | 660 | 1860 |
| 1060 | 1660 | 1760 | 840 | 1940 | 720 | 1920 |
| 1100 | 1700 | 1800 | 900 | 2000 | 780 | 1980 |
| 1140 | 1740 | 1840 | 960 | 2060 | 840 | 2040 |
| 1180 | 1780 | 1880 | 1020 | 2120 | 900 | 2100 |
| 1220 | 1820 | 1920 | 1080 | 2180 | 960 | 2160 |
| 1260 | 1860 | 1960 | 1140 | 2240 | 1020 | 2220 |
| 1300 | 1900 | 2000 | 1200 | 2300 | 1080 | 2280 |
| 1340 | 1940 | 2040 | 1260 | 2360 | 1140 | 2340 |
| 1380 | 1980 | 2080 | 1320 | 2420 | 1200 | 2400 |
| 1420 | 2020 | 2120 | 1380 | 2480 | 1260 | 2460 |
| 1460 | 2060 | 2160 | 1440 | 2540 | 1320 | 2520 |
| 1500 | 2100 | 2200 | 1500 | 2600 | 1380 | 2580 |

FIG. 10

VIDEO CONFERENCING OVER IP NETWORKS

CROSS-REFERENCE TO RELATED APPLICATION

This application is a continuation of U.S. patent application Ser. No. 11/890,382, filed Aug. 6, 2007 (to issue as U.S. Pat. No. 8,856,371 on Oct. 7, 2014), which claims priority to U.S. Provisional Patent Application 60/835,998, filed Aug. 7, 2006, the disclosures of which are incorporated herein by reference.

FIELD OF THE INVENTION

The present invention relates generally to video teleconferencing, and specifically to methods and systems for video teleconferencing over packet networks.

BACKGROUND OF THE INVENTION

Video teleconferencing (also known simply as video conferencing) is well known in the art as a means for allowing remote parties to participate in a discussion. Voice, video, and optionally other data are transmitted between the parties over a communication network, such as the Internet, LANs, and/or telephone lines. The parties are able to see, speak to and hear the other parties simultaneously over audio and video channels.

Early video conferencing systems used dedicated hardware systems and ISDN lines for communication among the conference parties. More recently, however, low-cost software-based solutions have become available for video conferencing over Internet Protocol (IP) packet networks. Systems of this sort include Microsoft® NetMeeting and Windows® Live Messenger, Yahoo!® Messenger, and Skype™.

SUMMARY OF THE INVENTION

Embodiments of the present invention that are described herein below provide methods, systems and software for use in packet-based video teleconferencing. These methods permit client computers to exchange video images and audio data via a server on the Internet or other packet network in a multipoint-to-multipoint conference. Alternatively, point-to-point conferences, with or without a dedicated server, are also supported. The server receives and transmits synchronization information from and to the client computers, along with video images and mixed audio data. The client computers use this information in synchronizing the individual video images captured by the other client computers with the mixed audio data, for output to users.

There is therefore provided, in accordance with an embodiment of the present invention, a method for communication, including:

establishing communication links over a packet network between a server and plurality of client computers that are to participate in a video teleconference;

receiving at the server from the client computers uplink audio packets and uplink video packets, which respectively contain audio and video data captured by each of the client computers;

mixing the audio data from the uplink audio packets at the server so as to create respective streams of mixed audio data for transmission to the client computers;

transmitting from the server to the client computers downlink audio packets containing the respective streams of mixed audio data;

relaying the video data from the server to the client computers in downlink video packets;

receiving and synchronizing the video data with the mixed audio data at the client computers; and outputting the synchronized video and mixed audio data to a respective user of each of the client computers.

In a disclosed embodiment, establishing the communication links includes establishing respective first and second communication links between first and second client computers and a server over the packet network using different, respective first and second transport layer protocols.

In some embodiments, receiving the uplink video packets includes controlling a quality of the video data conveyed to the server by the client computers by transmitting instructions from the server to the client computers. In one embodiment, transmitting the instructions includes receiving messages from the client computers that are indicative of downlink bandwidth availability for transmission from the server to the client computers, and determining the quality of the video data responsively to the downlink bandwidth availability. Typically, receiving the messages includes detecting, at one of the client computers, a delay in receiving one or more of the downlink audio and video packets, and informing the server of the delay, and transmitting the instructions includes instructing the clients to reduce the quality of the video data transmitted in the uplink video packets responsively to detecting the delay at the one of the clients.

Additionally or alternatively, controlling the quality includes instructing the client computers to increase or decrease at least one quality parameter selected from a group of quality parameters consisting of an image resolution, a degree of image compression, a frame rate and a bandwidth.

Additionally or alternatively, receiving the uplink packets includes detecting, at the server, a delay in the audio data, and eliminating an interval of silent audio data in order to compensate for the delay. In one embodiment, eliminating the interval includes marking, at one or more of the client computers, at least one block of the audio data as a silent block, and eliminating the silent block from the mixed audio data.

In some embodiments, each of the downlink video packets contains the video data captured by a respective one of the client computers. In one embodiment, outputting the synchronized video and mixed audio data includes displaying the video data captured by the respective one of the client computers in a respective window among multiple windows displayed by each of the client computers. Typically, synchronizing the video data includes controlling, at the client computer, the multiple windows so that the video data conveyed from each of the client computers are synchronized with the mixed audio data. Additionally or alternatively, relaying the video data includes passing the video data from the uplink video packets to the downlink video packets without transcoding of the video data at the server.

In a disclosed embodiment, receiving the uplink audio and video packets includes receiving at the server synchronization data from each of the client computers, and including generating synchronization information at the server based on the synchronization data, and transmitting the synchronization information from the server to the client computers for use in synchronizing the video data with the mixed audio data.

Typically, the plurality of client computers includes at least three client computers that participate in the video teleconference.

There is also provided, in accordance with an embodiment of the present invention, a method for communication, including:

establishing a first communication link between a first client computer and a server over a packet network using a first transport layer protocol;

establishing a second communication link between a second client computer and the server over the packet network using a second transport layer protocol, which is different from the first transport layer protocol; and exchanging audio and video data packets in a video teleconference between the first and second client computers via the server using the first and second transport layer protocols respectively over the first and second links.

In a disclosed embodiment, the first transport layer protocol is a Transmission Control Protocol (TCP), and the second transport layer protocol is a User Datagram Protocol (UDP), and establishing the first communication link includes opening a secure socket between the client computer and the server.

Alternatively, the first communication link is a unicast link, and the second communication link is a multicast link.

There is additionally provided, in accordance with an embodiment of the present invention, a method for communication, including:

configuring a first client computer to run a server program in a video teleconferencing application;

establishing a communication link over a packet network between the server program running on the first client computer and at least a second client computer; and exchanging audio and video data packets via the server program in a video teleconference between the first and at least the second client computer using client programs running on the client computers.

Typically, configuring the first client computer includes deciding, using the video teleconferencing application, whether to use the server program on the first client computer or a remote server in conducting the video teleconference.

There is further provided, in accordance with an embodiment of the present invention, communication apparatus, including:

a plurality of client computers, which are connected to communicate over a packet network and are configured to capture audio and video data and to transmit over the packet network uplink audio packets and uplink video packets, which respectively contain the audio and video data; and a conference server, which is coupled to establish communication links over the packet network with the client computers that are to participate in a video teleconference and to receive the uplink audio packets and uplink video packets over the communication links, and which is configured to mix the audio data from the uplink audio packets so as to create respective streams of mixed audio data for transmission to the client computers, and to transmit to the client computers downlink audio packets containing the respective streams of mixed audio data while relaying the video data from the uplink video packets to the client computers in downlink video packets, wherein the client computers are configured to synchronize the video data with the mixed audio data, and to output the synchronized video and mixed audio data to a respective user of each of the client computers.

There is moreover provided, in accordance with an embodiment of the present invention, a conference server, including:

a network interface, which is coupled to establish communication links over a packet network with a plurality of client computers that are to participate in a video teleconference, and to receive from the client computers uplink audio packets and uplink video packets, which respectively contain audio and video data captured by each of the client computers; and a processor, which is configured to mix the audio data from the uplink audio packets so as to create respective streams of mixed audio data for transmission to the client computers, and to transmit to the client computers via the network interface downlink audio packets containing the respective streams of mixed audio data while relaying the video data from the uplink video packets to the client computers in downlink video packets, for synchronization by the client computers with the mixed audio data.

There is furthermore provided, in accordance with an embodiment of the present invention, a conference server, including:

a network interface, which is coupled to communicate over a packet network with a plurality of client computers; and a processor, which is configured to establish, via the network interface, a first communication link with a first client computer using a first transport layer protocol, and a second communication link with a second client computer using a second transport layer protocol, which is different from the first transport layer protocol, and to exchange audio and video data packets in a video teleconference between the first and second client computers using the first and second transport layer protocols respectively over the first and second links.

There is also provided, in accordance with an embodiment of the present invention, communication apparatus, including first and second client computers, which are coupled to communicate with one another over a packet network, wherein the first client computer is configured to run a server program in a video teleconferencing application, to establish a communication link over the packet network between the server program running on the first client computer and the second client computer, and to exchange audio and video data packets via the server program in a video teleconference between the first and second client computers using client programs running on the first and second client computers.

There is additionally provided, in accordance with an embodiment of the present invention, a computer software product, including a computer-readable medium in which program instructions are stored, which instructions, when read by a server, cause the server to establish communication links over a packet network with a plurality of client computers that are to participate in a video teleconference, and to receive from the client computers uplink audio packets and uplink video packets, which respectively contain audio and video data captured by each of the client computers, wherein the instructions cause the server to mix the audio data from the uplink audio packets so as to create respective streams of mixed audio data for transmission to the client computers, and to transmit to the client computers via the network interface downlink audio packets containing the respective streams of mixed audio data while relaying the video data from the uplink video packets to the client computers in downlink video packets, for synchronization by the client computers with the mixed audio data.

There is further provided, in accordance with an embodiment of the present invention, a computer software product, including a computer-readable medium in which program instructions are stored, which instructions, when read by a client computer that is to participate in a video teleconference, cause the client computer to establish a communication link over a packet network with a conference server, and to transmit uplink audio packets and uplink video packets, which respectively contain audio and video data captured by the client computer, wherein the instructions cause the client computer to receive from the server downlink audio packets containing the a stream of mixed audio data generated by the server and to receive downlink video packets containing the video data transmitted by other client computers in the video teleconference, and to synchronize the video data with the mixed audio data for output to a respective user of each of the client computers.

There is moreover provided, in accordance with an embodiment of the present invention, a client computer, including:

a user interface; and a processor, which is configured to establish a communication link over a packet network with a conference server so as to participate in a video teleconference, and to transmit uplink audio packets and uplink video packets, which respectively contain audio and video data captured by the client computer, wherein the processor is configured to receive from the server downlink audio packets containing the a stream of mixed audio data generated by the server and to receive downlink video packets containing the video data transmitted by other client computers in the video teleconference, and to synchronize the video data with the mixed audio data for output via the user interface.

There is furthermore provided, in accordance with an embodiment of the present invention, a computer software product, including a computer-readable medium in which program instructions are stored, which instructions, when read by a server, cause the server to establish, via a packet network, a first communication link with a first client computer using a first transport layer protocol, and to establish, via the packet network, a second communication link with a second client computer using a second transport layer protocol, which is different from the first transport layer protocol, and to exchange audio and video data packets in a video teleconference between the first and second client computers using the first and second transport layer protocols respectively over the first and second links.

There is also provided, in accordance with an embodiment of the present invention, a computer software product, including a computer-readable medium in which program instructions are stored, which instructions, when read by a first client computer, cause the first client to run a server program in a video teleconferencing application, to establish a communication link over a packet network between the server program running on the first client computer and a second client computer, and to exchange audio and video data packets via the server program in a video teleconference between the first and second client computers using client programs running on the first and second client computers.

The present invention will be more fully understood from the following detailed description of the embodiments thereof, taken together with the drawings in which:

BRIEF DESCRIPTION OF THE DRAWINGS

FIG. 7 is a table showing the timing of audio and video data transmitted by client computers in a video teleconference, in accordance with an embodiment of the present invention;

FIG. 8 is a table showing messages sent to a server by a client computer in a video teleconference, in accordance with an embodiment of the present invention;

FIG. 9 is a table showing messages sent from a server to a client computer in a video teleconference, in accordance with an embodiment of the present invention; and FIG. 10 is a table showing timing of audio and video data frames received by a client computer in a video teleconference, in accordance with an embodiment of the present invention. The table illustrates how Alice's computer.

DETAILED DESCRIPTION OF EMBODIMENTS

Figure 1:
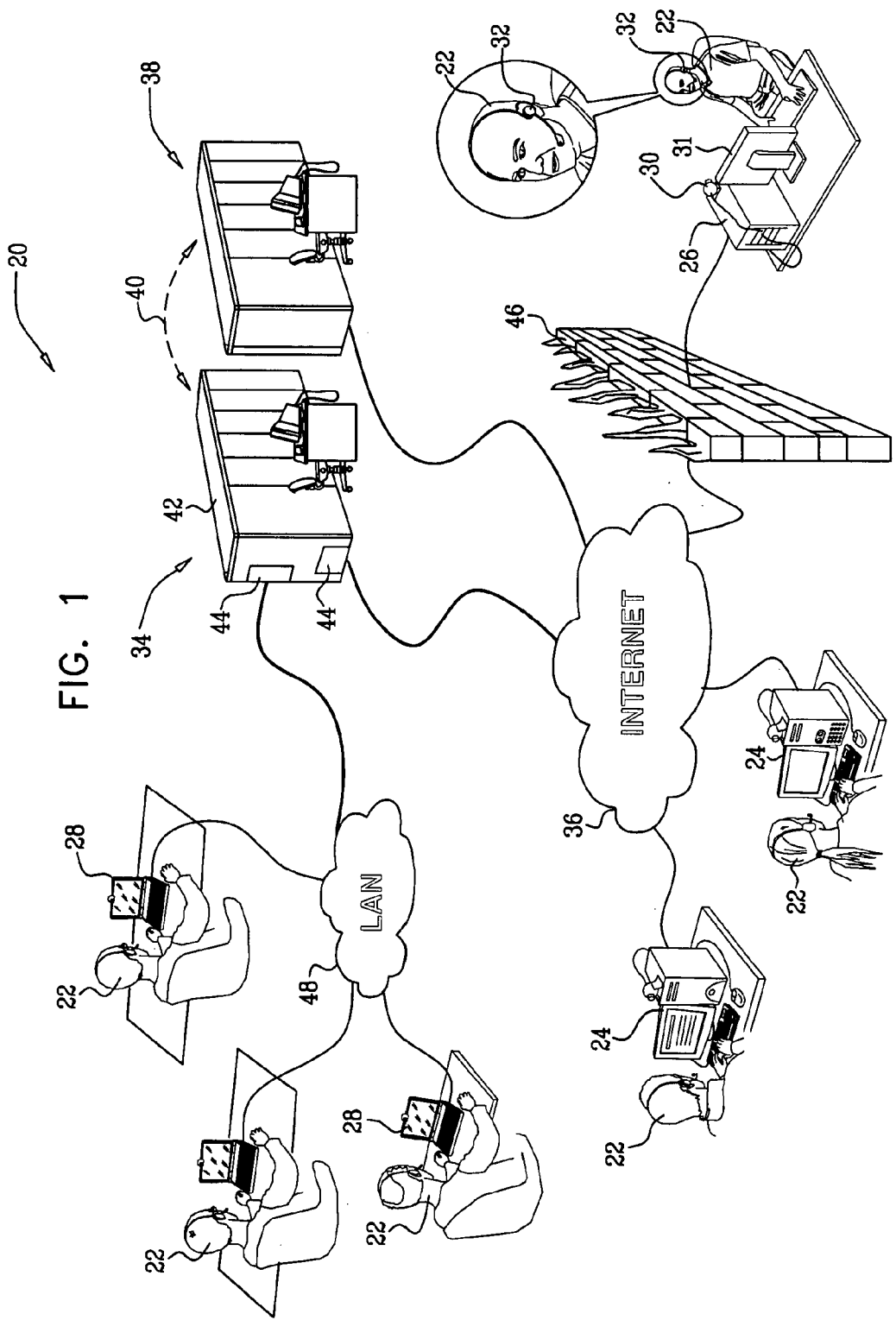
FIG. 1 is a schematic, pictorial illustration of a system for video teleconferencing, in accordance with an embodiment of the present invention.

FIG. 1 is a schematic, pictorial illustration of a system 20 for video teleconferencing, in accordance with an embodiment of the present invention. Users 22 access the system via client computers 24, 26, 28, which are typically equipped with suitable user interface components, including a video camera 30, a display monitor 31, and audio input/output (I/O) components 32. (In the description that follows, client computers are alternatively referred to simply as "clients.") Client computers 24 and 26 communicate with a conference server 34 via a packet network 36, such as the public Internet. Optionally, users may also communicate with the conference server and participate in the conference using a telephone handset (not shown) via a switched telephone network, such as a land or mobile network.

In some cases, a separate management server 38, similarly coupled to network 36, may be used for management tasks, such as tracking the client computers and/or users who are participating in each conference and conveying management messages (as opposed to audio and video data) to and from the client computers. For these purposes, servers 34 and 38 are typically connected by a communication link 40, which may be either in-band (via network 36) or out-of-band.

Server 34 (and likewise server 38) typically comprises a general-purpose computer processor 42, with suitable interfaces 44 to the network or networks on which the client computers are located. Client computers 24, 26, 28 may likewise comprise general-purpose computers, such as desktop or laptop computers, or may alternatively comprise portable computing devices with wireless communication interfaces and with sufficient computing power and suitable user interface components for performing the functions that are described herein. Processor 42 and client computers 24, 26, 28 perform the functions that are described herein under the control of software, which may be downloaded in electronic form (over a network, for example), or may be provided on tangible media, such as optical, magnetic or electronic memory media.

Video teleconferencing requires real-time, two-way transmission of video and audio data. In the Internet environment, this requirement may be complicated by intermediary components, such as a firewall 46. Firewalls are used, as is known in the art, to prevent malicious traffic on network 36 from reaching client computer 26. For this purpose, the firewall may prevent packets that are sent using simple, connectionless transport level protocols, such as the User Datagram Protocol (UDP), from reaching computer 26. UDP could otherwise be used conveniently and efficiently for transmitting real-time data. Other sorts of intermediary components, such as proxy servers (not shown), may cause similar sorts of problems. In such cases, it may be necessary for the server to use a connection-oriented transport level protocol, such as the Transmission Control Protocol (TCP), or possibly even a secure socket to transmit audio and video data downstream to the client computer. (In the present patent application and in the claims, the terms "downstream" and "downlink" are used in the conventional sense to refer to transmission of data packets from a server to a client, while "upstream" and "uplink" refer to transmission from a client to a server.)

Server 34 is configured, as described hereinbelow, to determine the appropriate and most efficient transport layer protocol to use for each client computer in a given video teleconference. The server may thus use TCP, with or without a secure socket, to communicate with one client computer in a given conference, while using UDP to communicate with another client computer in the same conference. The client computers are typically not aware of these differences in transport layer protocol. Thus, system 20 supports both point-to-point and multipoint-to-multipoint conferences in which different client computers simultaneously use different transport layer protocols.

In the example shown in FIG. 1, client computers 28 are connected to server 34 via a local area network (LAN) 48. This configuration permits server to transmit downlink packets to these client computers using a multicast or broadcast protocol. Optionally, interface 44 to LAN 48 may comprise multiple network interface cards, each configured to communicate with a respective subnet, in which case server 34 may transmit downlink packets simultaneously to several multicast groups on different subnets. Multicast and broadcast have the advantage of high efficiency in utilization of network resources, but they operate only in the downlink direction, not uplink. Client computers 28 may thus watch and listen by multicast or broadcast to a video teleconference involving one or more of client computers 24 and 26 on network 36. If one or more of client computers 28 are to participate actively in the conference, however, they will typically have to use a different, unicast protocol for uplink communication with server 34.

Figure 2:
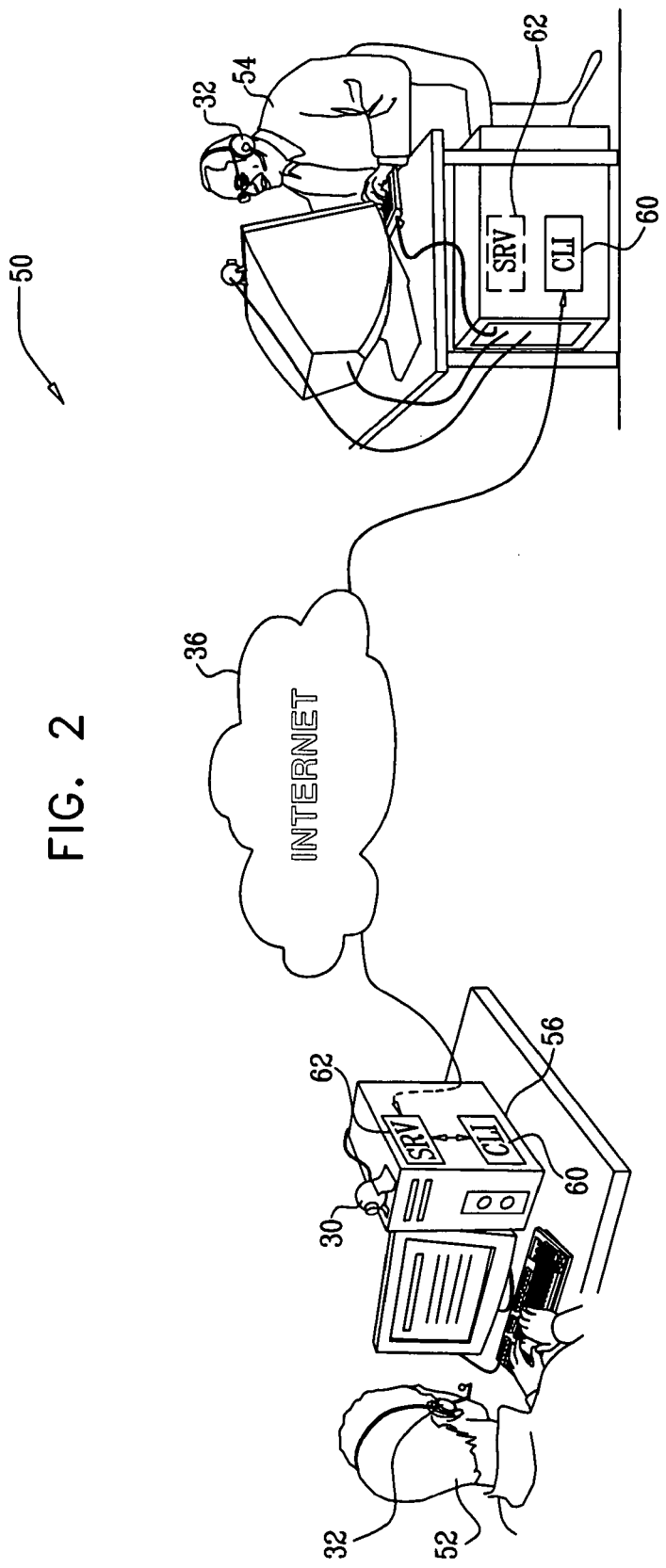
FIG. 2 is a schematic, pictorial illustration of a system for video teleconferencing, in accordance with another embodiment of the present invention.

FIG. 2 is a schematic, pictorial illustration of a system 50 for video teleconferencing, in accordance with another embodiment of the present invention. In this example, users 52 and 54 of respective computers 56 and 58 conduct a point-to-point video teleconference over network 36, with computer 56 acting as both client and server. The principles of this embodiment may similarly be applied in multipoint-to-multipoint conferencing, as long as the computer acting as the server has sufficient computing power to support multiple clients.

The teleconferencing software that is installed on computers 56 and 58 includes both a client component 60 and a server component 62. Client component 60 is configured to communicate with an external, remote server (such as server 34 in FIG. 1) for purposes of setting up the teleconference and exchanging video and audio data. In this mode of operation, server component 62 is dormant. In some circumstances, however, such as when user 52 initiates a point-to-point teleconference, client component 60 may decide to use server component 62 as a local server to set up the conference and exchange data with computer 58. Alternatively, server 34 may instruct client component 60 to use server component 62 when the client component contacts the server to establish the teleconference. In either case, this sort of local server operation is advantageous in reducing packet transmission delays between computers 56 and 58, since the packets are transmitted directly between the two computers, rather than relayed through server 34. This use of local servers also reduces the load on server 34.

When client component 60 invokes server component 62, the server component starts to run and emulates the operation of remote server 34. In other words, server component 62 communicates with client component 60 on computer 58 to invite user 54 to join the teleconference, and then transmits and receives audio and video packets to and from computer 58 via network 36 in the same manner as does server 34. The client component on computer 58 need not be aware that it is communicating with a local server on computer 56, rather than a remote server. Within computer 56, the client and server components pass data one to the other using an internal transport protocol, rather than over a network, but the principles of operation of the client and server components remain the same.

Thus, although the methods that are described hereinbelow make reference specifically, for the sake of clarity, to the elements of system 20 (FIG. 1), these methods may likewise be applied, mutatis mutandis, in system 50, as well as in other point-to-point, point-to-multipoint, and multipoint-to-multipoint conferencing topologies.

Figure 3:
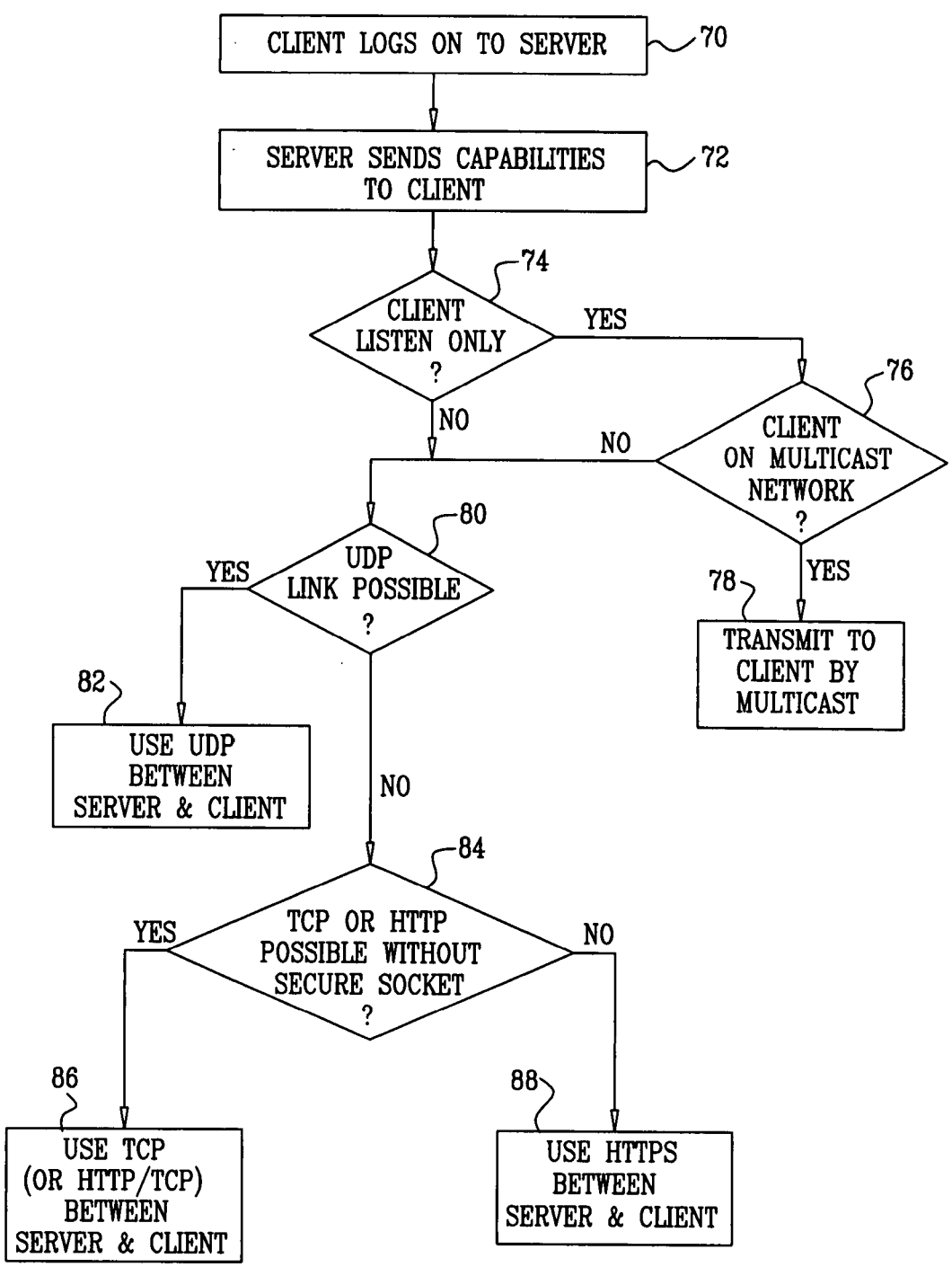
FIG. 3 is a flow chart that schematically illustrates a method for initiating a video teleconference, in accordance with an embodiment of the present invention

FIG. 3 is a flow chart that schematically illustrates a method for initiating a video teleconference, in accordance with an embodiment of the present invention. The method is initiated when a client computer logs on to server 34 (or server 38, depending on the system configuration), at a log-on step 70. For secure, reliable log-on and avoidance of problems due to components such as firewalls and proxies, the client computer may use a secure connection to the server. For example, the client computer may use the Hypertext Transfer Protocol (HTTP) over a Secure Socket Layer (SSL), commonly referred to as HTTPS, at step 70.

In response to the client log-on, server 34 sends one or more capabilities messages to the client, at a capability determination step 72. These messages tell the client which protocols and codecs (video and audio) the server can support, and may also indicate the IP address and port that the client should use in communicating with the server. The client chooses a protocol and codec according to its own capabilities and notifies the server of its choice. Different clients in the same conference may use different codecs, within the decoding capabilities of the server and the other clients.

In order to choose the transport protocol to use in communication with the client in a given teleconference, the client informs server 34 whether the client is going to be an active participant or will be listening only, at a status determination step 74. For listen-only clients, the server ascertains whether the client is connected to the server via a multicast-capable network (such as LAN 48), at a multicast checking step 76. If so, the server instructs the client to join the appropriate multicast group for the teleconference, and subsequently transmits downlink audio and video data packets to this client by multicast, at a multicast step 78. In an alternative embodiment, not shown in this figure, the server may be configured to transmit downlink packets to a given client or clients via multicast, while receiving uplink packets from such clients using a unicast transport protocol.

When multicast is unavailable or inappropriate, server 34 checks whether UDP can be used in communication with this client, at a UDP checking step 80. For this purpose, for example, the server may transmit a sequence of UDP packets to the client and request that the client respond to the UDP packets that it receives. On this basis, the server determines how many of the UDP packets were lost en route. (If a component such as firewall 46 blocks the UDP packets, then all the packets will be lost.) If the number of UDP packets lost is less than a small, predetermined threshold percentage, the server concludes that a UDP link can be used effectively for communicating with this client, at a UDP selection step 82. Because UDP is connectionless and does not require acknowledgment, it generally gives lower delay in packet delivery than connection-oriented protocols.

As the next alternative, the server may attempt to establish a TCP connection, and to communicate with the client using the TCP connection without a secure socket, at a TCP checking step 84. Some intermediary components, such as firewalls, may be configured to allow any TCP connection to be established between the server and the client, while others may allow only HTTP messages to be transmitted over such a TCP connection. If the server is successful in setting up a non-secured TCP connection with the client (with or without HTTP), the server will then use such TCP connections for exchanging audio and video data with the client during the teleconference, at a TCP selection step 86. When possible, the server may give preference to using TCP without HTTP, in order to avoid possible delays in packet delivery that may be caused by HTTP proxy servers.

Otherwise, the server will establish and use HTTPS for conveying audio and video packets to and from the client, at a HTTPS selection step 88. HTTPS incurs greater overhead than the other protocols noted above, but it has the advantage of passing data without interruption through nearly all firewalls, proxies and other intermediary components. Normally, HTTPS messages are conveyed as an encrypted payload within a TCP datagram. Once the HTTPS connection between the server and the client is established, however, packets with substantially any sort of payload (encrypted or not) will be conveyed through intermediary devices as long as they have the appropriate TCP/SSL header. The server and client may thus insert audio and video data in the payload of each of these packets in a proprietary format, rather than using conventional HTTP requests and replies.

Figure 4:
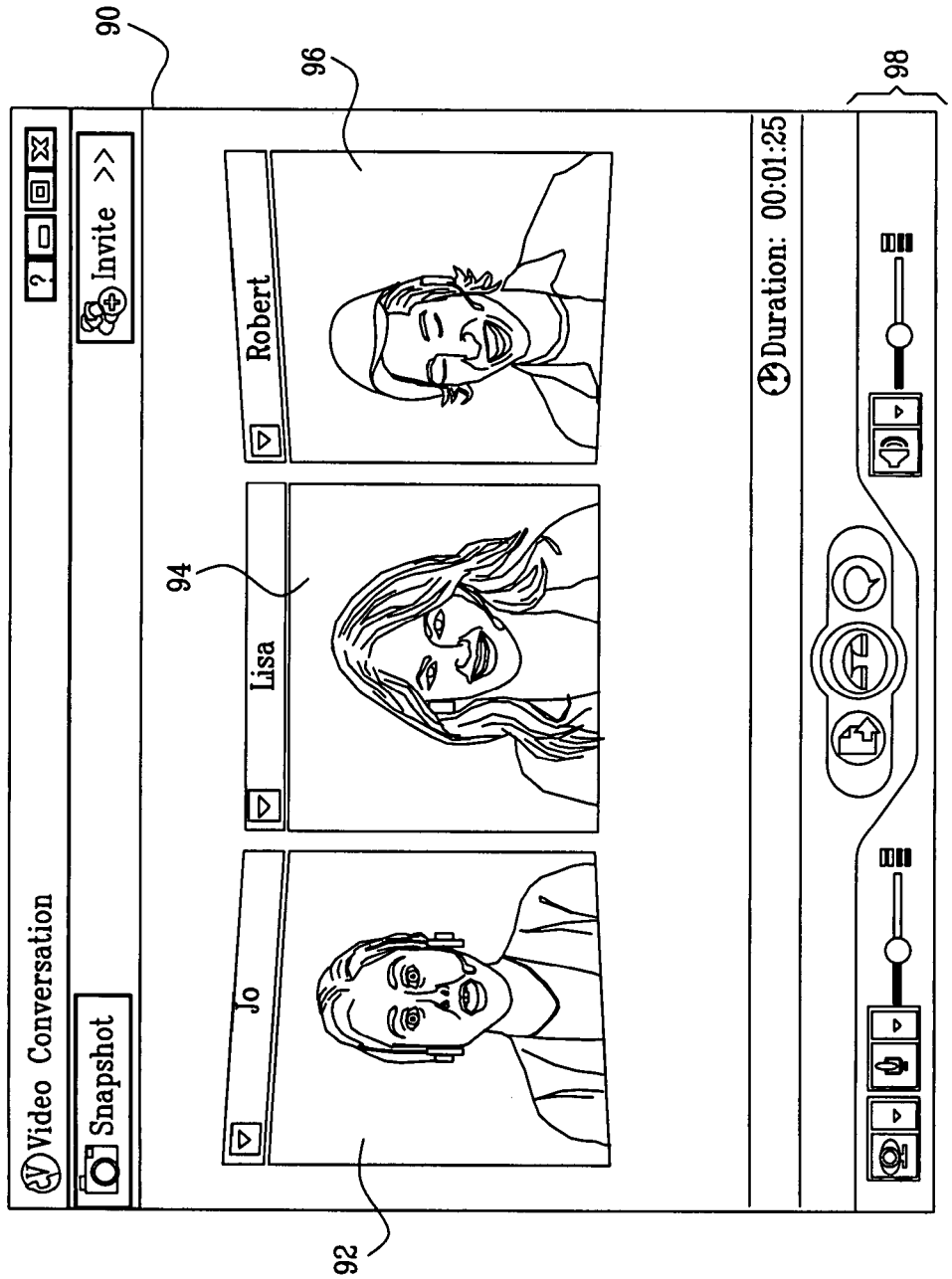
FIG. 4 is a schematic representation of a screen displayed by a client computer in a video teleconference, in accordance with an embodiment of the present invention.

FIG. 4 is a schematic representation of a screen 90 displayed by a client computer in a video teleconference, in accordance with an embodiment of the present invention. The screen comprises multiple windows 92, 94, 96, each of which is fed with video data conveyed by server 34 from a different client computer. In other words, each of the client computers participating the teleconference transmits uplink video packets, which the server then relays to the other client computers in the teleconference for display in the respective windows. At the same time, the server mixes the uplink audio data from these client computers to create mixed audio downlink packets. Thus, for example, the client computer that displays screen 90 will receive separate video packets representing each of the individual images to be displayed in windows 92, 94 and 96, as transmitted by the other client computers in the teleconference, and will receive audio packets containing a mix of the uplink audio data transmitted by these client computers. To display screen 90, the client computer synchronizes the images in windows 92, 94 and 96 with the mixed audio data, as described in detail hereinbelow.

Screen 90 also includes on-screen controls 98, which enable the user of the client computer to interact with the teleconferencing software. For example, the controls may comprise an "invite" button, which brings up a list of contacts and their availability. The user may select contacts to invite to a teleconference, whereupon the client computer attempts to establish communications with the contacts (using a model similar to instant messaging and Internet voice services). Other controls may permit the user to mute uplink voice, block uplink video, leave the teleconference, and perform other sorts of functions that will be apparent to those skilled in the art. The user may choose to view video images of all the other teleconference participants, or may alternatively choose to view only a subset of the participants (in order to conserve bandwidth, for example). Although different client computers may use cameras 30 with different levels of resolution and image format, the client software running on each of the computers typically adjusts the images so that all of windows 92, 94, 96 have the same size and format.

Figure 5:
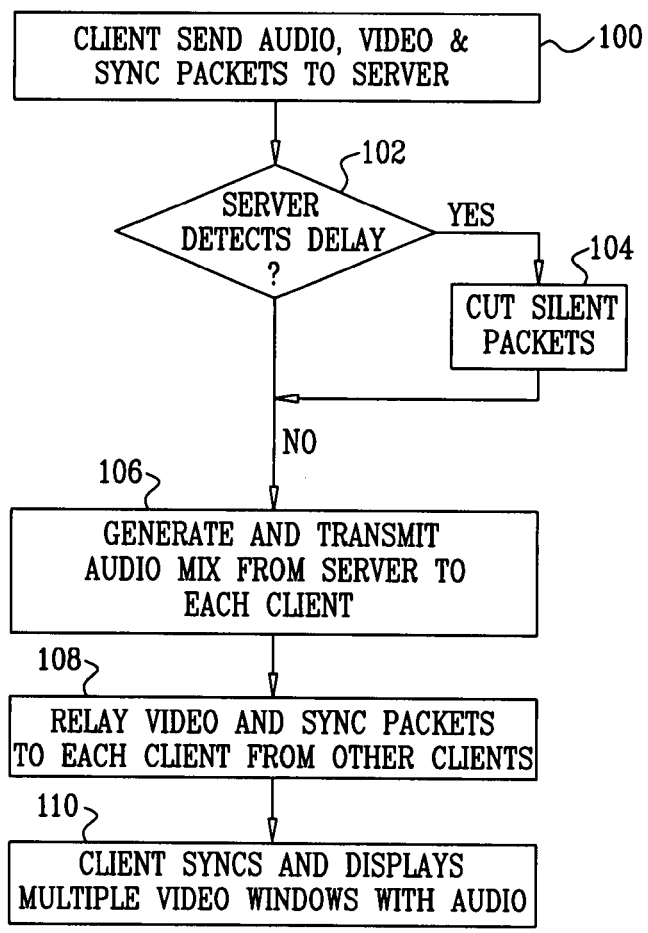
FIG. 5 is a flow chart that schematically illustrates a method for synchronizing and displaying data in a video teleconference, in accordance with an embodiment of the present invention.

FIG. 5 is a flow chart that schematically illustrates a method for synchronizing and displaying data in a video teleconference, in accordance with an embodiment of the present invention. Client computers participating in the teleconference transmit uplink audio, video and synchronization packets to server 34, at an uplink transmission step 100. To reduce communication delays, as well as reducing the computational load on the server, the client computers transmit audio and video data in separate packets, and generally transmit relatively small packets at regular intervals. Each packet is marked with a timestamp, as explained in detail hereinbelow, while the synchronization packets indicate how the audio and video data should be aligned according to their respective timestamps.

For example, depending on the audio codec used by a given client computer, the client computer may generate a block of compressed audio data every 20 ms. Each block may be sent in its own packet, or a group of blocks may be combines in a single packet. (For instance, six of these blocks may be combined into a audio uplink packet every 120 ms.) Server 34 may determine the size of the audio packets based on the arrival statistics of packets that it receives from the client computers, such as delay, timing jitter and packet loss, and/or other network conditions, and may instruct the clients to use the packet size that it determines in this manner.

When TCP is used as the transport layer protocol, the TCP buffer size at the client and server is typically set to zero, so that packets are transmitted immediately (without the delay that TCP may otherwise add in an attempt to optimize overall throughput). Furthermore, to avoid retransmission of lost packets, the client computer and server may be programmed to suppress the impact of the packet acknowledgement feature of TCP, possibly by acknowledging all TCP packet serial numbers regardless of whether or not the packets were actually received.

During a teleconference, any given user will typically be silent much of the time, while listening to the other users. The client computer senses these silent intervals and marks the corresponding audio blocks in the uplink audio packets as "silent." To ensure proper detection of silent intervals, the teleconferencing software on the client computer may control the automatic gain control of the audio driver on the client computer to prevent the driver from turning up the gain when the user is not speaking.

Server 34 tracks the timestamps of the uplink audio and video packets that it receives from the participating client computers, at a delay detection step 102. The server may thus determine that a delay has developed in the stream of audio data arriving from one (or more) of the clients. If so, the server drops blocks or packets of audio data that the client in question has marked as silent, at a silence removal step 104, in order to restore proper synchronization. Similarly, if the server detects a delay in the uplink video packets from one of the clients, it may drop video frames.

After temporally aligning the uplink audio data, server 34 creates an audio mix for transmission to each of the client computers in the teleconference, at a mixing step 106. Each client receives a mix of the audio data generated by the other clients. Thus, the server generates a number of different audio mixes, equal to the number of clients who are actively participating in the teleconference. The audio mix packets contain their own timestamps, determined by the server, and may be accompanied by audio sync packets generated by the server. In addition to transmitting the audio mix and audio sync packets to the client, the server also relays to each client the video data and video sync packets transmitted by the other clients, at a packet relay step 108. In other words, while the audio data are mixed at the server, the video images and sync messages transmitted by the various clients are kept separate.

Each client receives the audio mix, video and sync packets, at a packet reception step 110. The video data from each of the other clients are used to generate an image in the corresponding window 92, 94, 96, as shown in FIG. 4. The clients use the information in the sync packets, together with the timestamps in the audio mix and video packets, to synchronize the individual video images with the mixed audio. In other words, the client plays the audio mix and decides, based on the sync information and timestamps, which video frames to display in each of the windows at each point in time. The client may speed up or slow down the video display in one or more of windows 92, 94, 96 in order to keep the timestamps of the video and the audio mix data properly aligned. If the client detects a delay in the audio stream, it may cut out any remaining silent intervals, or it may resample and slightly accelerate the sound output to make up the delay. If the client detects excessive delays, however, the client may notify the server of the problem, and the server will take remedial action, as described hereinbelow with reference to FIG. 6.

A detailed scenario illustrating the operation of the synchronization mechanisms described above is presented hereinbelow in an Appendix.

Figure 6:
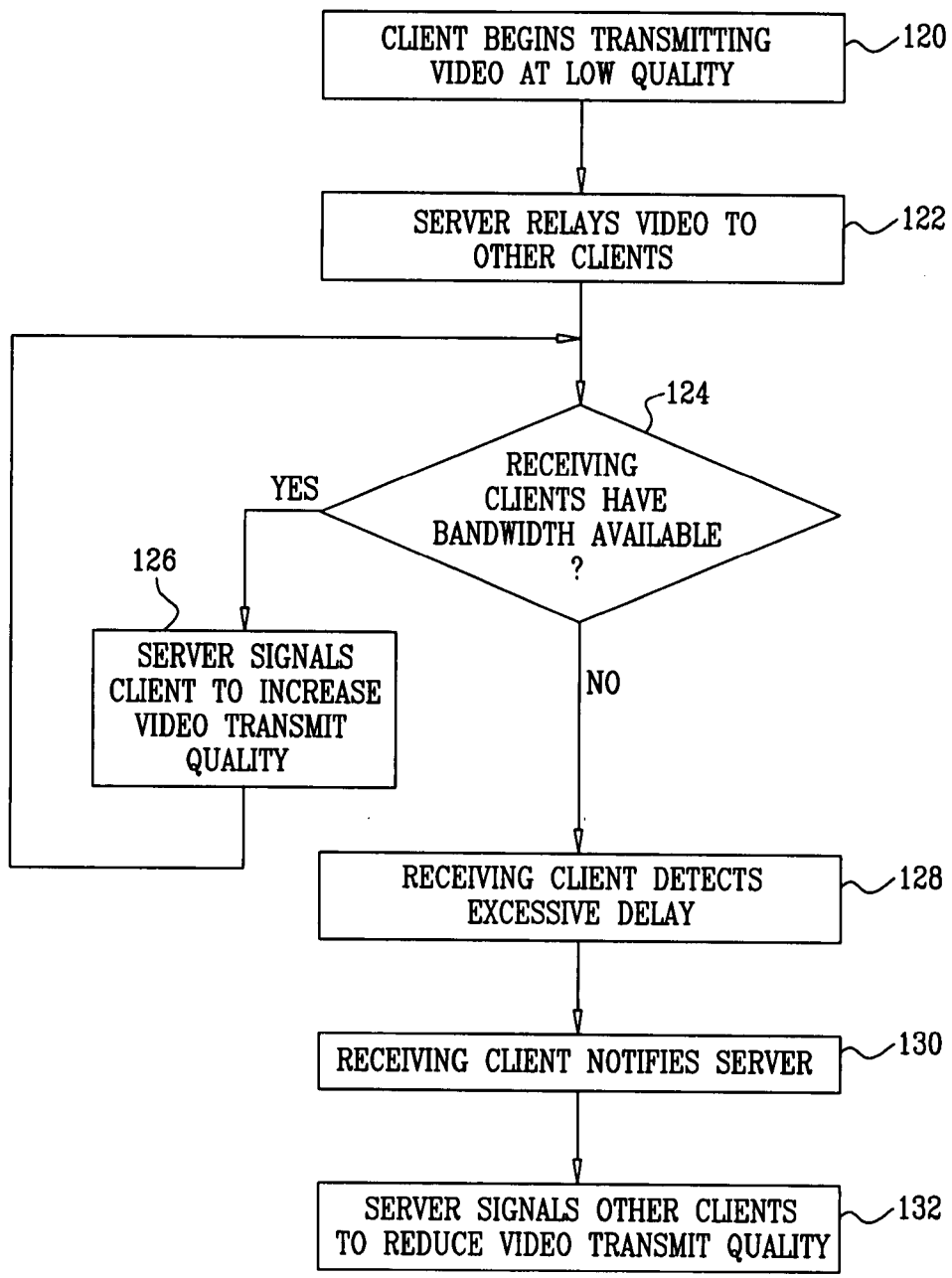
FIG. 6 is a flow chart that schematically illustrates a method for controlling bandwidth in a video teleconference, in accordance with an embodiment of the present invention.

FIG. 6 is a flow chart that schematically illustrates a method for controlling bandwidth in a video teleconference, in accordance with an embodiment of the present invention. This method is carried out in parallel with the method of FIG. 5 in the course of a teleconference in system 20. An object of this method is to make optimal use of the bandwidth available between the client computers and server 34. The bandwidth utilization is optimal in the sense that the client computers receive and display video images transmitted by the other client computers with the best possible image quality that can be supported reliably by the available bandwidth. "Quality" in this context may be expressed in terms of the image resolution, the frame update rate, or the degree of image compression (wherein greater compression, in lossy compression schemes, means poorer quality), all of which affect the bandwidth required for transmission of the video stream.

The available bandwidth is determined, as explained further hereinbelow, based on messages sent from the client computers to the server. This available bandwidth usually corresponds (with some exceptions) to the bandwidth of the "weakest link" in the teleconference, i.e., the bandwidth of the client with the slowest connection to the server. Although other client computers in the teleconference with faster connections to the server may be capable of transmitting uplink video packets with higher quality, the server would then have to expend considerable computing power in transcoding the high-quality video frames to a lower-quality format suitable for the "weakest link." In order to avoid placing this additional burden on the server, the client computers are instructed by the server to limit the quality of their video transmissions to the available bandwidth that is dictated by the server. Alternatively or additionally, the server may be capable of performing certain video transcoding functions, as well, in order to compensate for bandwidth discrepancies among the clients.

At the start of the teleconference, all clients begin transmitting video data packets at a low data rate, such as 48 kbps, at a transmission initiation step 120. Server 34 relays the video data packets (along with the audio mix packets, as described above) to the other clients, at a video relay step 122. The clients check the arrival statistics of the video data packets, at a bandwidth checking step 124. For example, the clients may check the average delay, jitter and/or fraction of packets lost. Low values of these statistical parameters indicate that the downlink transmissions to the client in question are well within the bounds of the available downlink bandwidth for this client, and additional bandwidth is still available for downlink transmission.

When the client computers determine at step 24 that they have additional bandwidth available, they send control messages to server 34 informing the server of the situation. The server checks the control messages from all the client computers to verify that all have additional bandwidth available, and if so, signals the client computers to increase the quality of the video images that they are transmitting, at a quality upgrade step 126. The clients then recheck the arrival statistics at step 124. If the packet arrival statistics are still favorable, the client computers notify the server, which then repeats step 126. The clients and server iterate through steps 124 and 126 as long as additional, unused bandwidth remains available.

As the bandwidth used for downlink transmission in the teleconference approaches the limit of available downlink bandwidth, however, the statistical packet arrival parameters will begin to increase. Thus, a client may note, for example, an increase in average packet delay, and will notify the server accordingly. At this point, the server will stop instructing the clients to increase video quality and may even instruct the clients to back off a step in order to leave a margin for bandwidth fluctuations.

During the teleconference, the client computers continue to monitor the packet arrival statistics, at a monitoring step 128. As a result, a client may note that one (or more) of the parameters has increased by more than a preset threshold above the initial, baseline value. For example, the client may determine that the packet delay has increased by 200 ms relative to the baseline. This sort of increase may indicate that a change in network conditions has reduced the downlink bandwidth available to the client. The client immediately sends a message to notify the server of the problem, at a server notification step 130.

To ensure rapid response, the client exchanges control messages with server 34 (using TCP) via a different socket from the one that is used for audio and video data, and the messages are handled by a dedicated software module in the server. The advantage of using the dedicated socket and module in this manner is that the communication channels of the conference server may be loaded with audio and video data, which may cause a delay in processing of the message sent at step 130. The dedicated module and socket, on the other hand, are not burdened with audio and video data and may therefore be able to respond immediately. Alternatively or additionally, when bandwidth problems occur, clients may notify not only conference server 34, but also management server 38 (assuming a separate management server is in use).

Generally, upon receiving the message sent by the client at step 130, server 34 or 38 immediately instructs the clients in the teleconference to reduce their video transmission quality, at a quality reduction step 132. As a result, the quality of the video images displayed by all the clients will be reduced, but all of the participants in the teleconference will still be able to see all of the other participants and maintain full participation. Alternatively, when one (or a few) of the client computers has significantly less bandwidth available than the remaining client computers in the teleconference, the server may instruct this "weak" client to reduce the number of live video windows that it is displaying. The server may then pass video data downstream to the weak client only from those other clients whose images are displayed in the live windows, while cutting off the video streams from other clients. In this manner, the user of the weak client is still able to hear the audio and see images of some of the other participants, without detracting from the experience of the other participants. (In extreme cases, the weak client may be instructed to turn off the live video display entirely.)

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—AUDIO/VIDEO SYNCHRONIZATION

The scenario presented in this Appendix assumes that client computers belonging to three users, Alice, Bob and Charlie, are to participate in a video teleconference via server 34. Each client computer keeps track of two different times:

Clock Time (CT)—the internal computer time, using ticks to represent the number of milliseconds since the computer was last restarted.

Stream Time (ST)—the time elapsed since the computer started to send audio and video to the server. Like the clock time, it is measured in milliseconds.

In the video teleconference, every client computer periodically sends two different types of sync messages, one for audio and one for video, indicating the relation between clock time and stream time. The clock time is the same for audio and video, but the stream time is typically different, because the computer does not always start to send the video data at the exact same time as starting to send the audio data. Sync messages are sent at preset intervals (typically in the range 1-5 sec). Each data message transmitted by a client computer holds the video (or audio) data itself in binary format, along with a timestamp indicating the corresponding stream time.

FIG. 7 is a table showing the timing of audio and video data transmitted by the participants in this sample video teleconference, in accordance with an embodiment of the present invention. For each user, the table shows the sequence of audio data blocks and video frames generated by the corresponding computer, labeled with the corresponding clock times and stream times. As noted above, the stream times of the audio and video data for each user start at different points in clock time. (For example, for Alice, the audio stream starts at CT=1000, while the video stream starts at CT=1100.) These discrepancies are resolved by the use of sync messages.

FIG. 8 is a table showing the messages sent to server 34 by Alice's computer, in accordance with an embodiment of the present invention. When Alice starts to send her video, her computer sends an audio sync message with her computer clock time (1000) and '0' (zero) in the stream time, followed by an audio data packet containing audio data and '0' stream time. Immediately thereafter, the computer begins transmitting the video stream with a video sync message (clock time 1100, stream time 0), followed by a video data packet with '0' stream time. Subsequent audio and video data packets contain a timestamp indicating the current stream time, which is incremented by the appropriate audio interval or video interval.

After the preset synchronization interval has elapsed (in this case, 1 sec) in a given data stream, the computer transmits a further sync packet, giving the current clock time and stream time. Thus, as shown in FIG. 8, the computer transmits a video sync packet at CT=2100, ST=1000. (Because of the shorter audio interval, the time covered by FIG. 8 does not include the next audio sync packet.) The periodic sync packets permit the server and client computers to detect and correct inaccuracies of synchronization.

FIG. 9 is a table showing the messages sent from server 34 to Alice's computer, in accordance with an embodiment of the present invention. As noted earlier, the video data and video sync packets from Bob's and Charlie's computers are passed through by the server to Alice's computer without change. The server generates downlink audio data packets containing a mix of the audio data received from Bob's and Charlie's computers. The stream time of the audio mix, which is inserted by the server as a timestamp in the downlink audio data packets, is determined by the server and generally does not correspond to the stream times of the client computers. Therefore, the server also generates and transmits to Alice's computer audio sync packets, which indicate the correspondence between the stream time of the audio mix and the individual clock times of Bob's and Charlie's computers.

Alice's computer plays the received audio mix and synchronizes the video data with the audio using the time information (clock time and stream time) contained in the sync messages. For each downlink audio data packet, the client computer performs the following steps:

Receive the audio mix data message.

Get the audio mix stream time from this message.

Add this audio mix stream time to the clock time from the synchronization message of every participant and get the clock time for this audio mix (different clock time for each participant).

Find the same clock time in the video stream of each participant, using the video synchronization and data messages.

Display the video frame corresponding to this clock time.

FIG. 10 is a table showing the timing of the audio mix and video data frames received by Alice's computer, in accordance with an embodiment of the present invention. The table illustrates how Alice's computer synchronizes the video data sent by Bob's and Charlie's computers with the audio mix. For example, at stream time 900 in the audio mix (in the leftmost column of the table), Alice's computer determines that Bob's clock time is 1500, while Charlie's clock time is 1600. Alice's computer uses these clock times as an index to find the closest corresponding frames in Bob's and Charlie's video streams. Thus, for audio stream time 900, Alice's computer will display the frame from Bob's video stream that has clock time 1460 and video stream time 360, while displaying the frame from Charlie's video stream that has clock time 1560 and stream time 360 (coincidentally the same as Bob's).

The invention claimed is:

1. A method for communication, comprising:
   establishing communication links over a packet network;
   receiving uplink audio packets and uplink video packets, which respectively contain audio and video data;
   mixing the audio data from the uplink audio packets to create respective streams of mixed audio data for transmission;
   transmitting downlink audio packets containing the respective streams of mixed audio data;
   relaying the video data in downlink video packets;
   analyzing relative time differences between the mixed audio data and each relayed video data stream;
   generating at least one corresponding synchronization packet based on the analyzed relative time differences between mixed audio data and each relayed video data stream; and,
   transmitting the at least one corresponding synchronization packet containing synchronization information for synchronizing the relayed video data in the downlink video packets with the downlink audio packets containing the respective streams of mixed audio data in addition to transmitting the downlink video packets and the downlink audio packets.

2. The method according to claim 1, wherein receiving the uplink video packets comprises controlling a quality of the video data by transmitting instructions.

3. The method according to claim 2, wherein transmitting the instructions comprises receiving messages that are indicative of downlink bandwidth availability for transmission, and determining the quality of the video data responsively to the downlink bandwidth availability.

4. The method according to claim 3, wherein receiving the messages comprises detecting a delay in receiving one or more of the downlink audio and video packets.

5. The method according to claim 4, wherein transmitting the instructions comprises instructions to reduce the quality of the video data transmitted in the uplink video packets responsively to detecting the delay in receiving one or more of the downlink audio and video packets.

6. The method according to claim 2, wherein controlling the quality comprises instructing an increase or decrease of at least one quality parameter selected from a group of quality parameters consisting of an image resolution, a degree of image compression, a frame rate and a bandwidth.

7. The method according to claim 1, wherein receiving the uplink packets comprises detecting a delay in the audio data and eliminating an interval of silent audio data in order to compensate for the delay.

8. The method according to claim 7, wherein eliminating the interval comprises marking at least one block of the audio data as a silent block and eliminating the silent block from the mixed audio data.

9. The method according to claim 1, wherein relaying the video data comprises passing the video data from the uplink video packets to the downlink video packets without transcoding of the video data at the server.

10. The method according to claim 1, wherein receiving the uplink audio and video packets comprises receiving synchronization data, generating synchronization information on the synchronization data, and transmitting the synchronization information for use in synchronizing the video data with the mixed audio data.

11. A communication apparatus, comprising:
    a server, which is coupled to establish communication links over a packet network with remote computers that are to participate in a video teleconference and to receive uplink audio packets and uplink video packets, which respectively comprise audio and video data, over the communication links;
    wherein the server is configured to mix the audio data from the uplink audio packets so as to create respective streams of mixed audio data for transmission to the remote computers, and to generate at least one synchronization packet containing synchronization information, and to transmit to the remote computers downlink audio packets containing the respective streams of mixed audio data in addition to the at least one synchronization packet while relaying the video data from the uplink video packets to the client computers in downlink video packets.

12. The apparatus according to claim 11, wherein the server is configured to establish respective first and second communication links with first and second remote computers over the packet network using different, respective first and second transport layer protocols.

13. The apparatus according to claim 11, wherein the server is configured to control a quality of the video data conveyed to the server by transmitting instructions to the remote computers.

14. The apparatus according to claim 13, wherein the server is coupled to receive messages that are indicative of downlink bandwidth availability for transmission from the server, and to determine the quality of the video data responsively to the downlink bandwidth availability.

15. The apparatus according to claim 14, wherein the server is coupled to receive messages that are indicative of a delay in receiving one or more of the downlink audio and video packets by the remote computers.

16. The apparatus according to claim 15, wherein the server is configured to instruct the remote computers to reduce the quality of the video data transmitted in the uplink video packets responsively to detecting the delay at one or more of the clients.

17. The apparatus according to claim 11, wherein the server is configured to detect a delay in the audio data, and to eliminate an interval of silent audio data in order to compensate for the delay.

18. The apparatus according to claim 11, wherein each of the downlink video packets contains the video data captured by a respective one of the remote computers.

19. The apparatus according to claim 18, wherein the server is configured to pass the video data from the uplink video packets to the downlink video packets without transcoding of the video data at the server.

20. The apparatus according to claim 11, wherein the server is configured to receive synchronization data from the remote computers, generate the synchronization information based on the synchronization data, and transmit the synchronization information to the remote computers.

21. A server, comprising:
    a network interface, which is coupled to establish communication links over a packet network with a plurality of remote computers that are to participate in a video teleconference, and to receive from the remote computers uplink audio packets and uplink video packets, which respectively contain audio and video data captured by each of the remote computers; and
    a processor, which is configured to mix the audio data from the uplink audio packets so as to create respective streams of mixed audio data for transmission to the remote computers and to generate at least one synchronization packet containing synchronization information, and to transmit to the remote computers via the network interface downlink audio packets containing the respective streams of mixed audio data in addition to the at least one synchronization packet while relaying the video data from the uplink video packets to the remote computers in downlink video packets.

22. A computer program product, comprising a computer usable medium having a computer readable program code embodied therein, said computer readable program code adapted to be executed to implement a method for implementing a method for communication, said method comprising:
   establishing communication links over a packet network;
   receiving uplink audio packets and uplink video packets, which respectively contain audio and video data;
   mixing the audio data from the uplink audio packets to create respective streams of mixed audio data for transmission;
   transmitting downlink audio packets containing the respective streams of mixed audio data;
   relaying the video data in downlink video packets;
   analyzing relative time differences between the mixed audio data and each relayed video data stream;
   generating at least one corresponding synchronization packet based on the analyzed relative time differences between mixed audio data and each relayed video data stream; and,
   transmitting the at least one corresponding synchronization packet containing synchronization information for synchronizing the relayed video data in the downlink video packets with the downlink audio packets containing the respective streams of mixed audio data in addition to transmitting the downlink video packets and the downlink audio packets.

23. The computer program product according to claim 22, wherein receiving the uplink video packets comprises controlling a quality of the video data by transmitting instructions.

24. The computer program product according to claim 23, wherein transmitting the instructions comprises receiving messages that are indicative of downlink bandwidth availability for transmission, and determining the quality of the video data responsively to the downlink bandwidth availability.

25. The computer program product according to claim 24, wherein receiving the messages comprises detecting a delay in receiving one or more of the downlink audio and video packets.

26. The computer program product according to claim 25, wherein transmitting the instructions comprises instructions to reduce the quality of the video data transmitted in the uplink video packets responsively to detecting the delay in receiving one or more of the downlink audio and video packets.

27. The computer program product according to claim 23, wherein controlling the quality comprises instructing an increase or decrease of at least one quality parameter selected from a group of quality parameters consisting of an image resolution, a degree of image compression, a frame rate and a bandwidth.

28. The computer program product according to claim 22, wherein receiving the uplink packets comprises detecting a delay in the audio data and eliminating an interval of silent audio data in order to compensate for the delay.

29. The computer program product according to claim 28, wherein eliminating the interval comprises marking at least one block of the audio data as a silent block and eliminating the silent block from the mixed audio data.

30. The computer program product according to claim 22, wherein relaying the video data comprises passing the video data from the uplink video packets to the downlink video packets without transcoding of the video data at the server.

31. The computer program product according to claim 22, wherein receiving the uplink audio and video packets comprises receiving synchronization data, generating synchronization information on the synchronization data, and transmitting the synchronization information for use in synchronizing the video data with the mixed audio data.

32. A method for communication, comprising:
   establishing communication links over a packet network;
   transmitting uplink audio packets and uplink video packets, which respectively contain audio and video data;
   receiving downlink audio packets containing respective streams of mixed audio data, wherein the downlink audio packets contain mixed audio data from at least one remote computer;
   receiving downlink video packets, which comprise video data from the at least one remote computer; and,
   receiving at least one corresponding synchronization packet comprising synchronization information based on relative time differences between the mixed audio data and the video data from the at least one remote computer for synchronizing the video data in the downlink video packets with the downlink audio packets containing the respective streams of mixed audio data in addition to receiving the downlink video packets and the downlink audio packets.

33. The method according to claim 32, wherein receiving at least one corresponding synchronization packet comprises receiving messages that are indicative of downlink bandwidth availability for transmission.

34. The method according to claim 33, wherein receiving the messages comprises detecting a delay in receiving one or more of the downlink audio and video packets, and transmitting the delay.

35. The method according to claim 34, wherein synchronizing the video data comprises controlling the multiple windows so that the video data conveyed from each of the remote computers are synchronized with the mixed audio data.

36. The method according to claim 35, wherein controlling the quality comprises increasing or decreasing at least one quality parameter selected from a group of quality parameters consisting of an image resolution, a degree of image compression, a frame rate and a bandwidth.

37. The method according to claim 36, wherein controlling the quality comprises eliminating an interval of silent audio data in order to compensate for the delay by marking at least one block of the audio data as a silent block, and eliminating the silent block from the mixed audio data.

38. The method according to claim 37, wherein each of the downlink video packets contains the video data from each respective at least one remote computer.

39. The method according to claim 32 further comprising the steps of:
   receiving and synchronizing the video data with the mixed audio data based on synchronization data from the received synchronization packet; and
   outputting the synchronized video and mixed audio data to a respective user of each of the remote computers wherein outputting the synchronized video and mixed audio data comprises displaying the video data captured by the respective one of the remote computers in a respective window among multiple windows displayed by each of the remote computers.

40. The method according to claim 39, wherein synchronizing the video data comprises controlling the multiple windows so that the video data conveyed from each of the remote computers are synchronized with the mixed audio data.

41. A computer program product, comprising a computer usable medium having a computer readable program code embodied therein, said computer readable program code adapted to be executed to implement a method for implementing a method for communication, said method comprising:
 establishing communication links over a packet network;
 transmitting uplink audio packets and uplink video packets, which respectively contain audio and video data;
 receiving downlink audio packets containing respective streams of mixed audio data, wherein the downlink audio packets contain mixed audio data from at least one remote computer;
 receiving downlink video packets, which comprise video data from the at least one remote computer; and,
 receiving at least one corresponding synchronization packet comprising synchronization information based on relative time differences between the mixed audio data and the video data from the at least one remote computer for synchronizing the video data in the downlink video packets with the downlink audio packets containing the respective streams of mixed audio data in addition to receiving the downlink video packets and the downlink audio packets.

42. The computer program product according to claim 41, wherein receiving at least one corresponding synchronization packet comprises receiving messages that are indicative of downlink bandwidth availability for transmission.

43. The computer program product according to claim 42, wherein receiving the messages comprises detecting a delay in receiving one or more of the downlink audio and video packets, and transmitting the delay.

44. The computer program product according to claim 43, wherein receiving the messages comprises receiving instructions for controlling quality by reducing the quality of the video data transmitted in the uplink video packets responsively to detecting the delay.

45. The computer program product according to claim 44, wherein controlling the quality comprises increasing or decreasing at least one quality parameter selected from a group of quality parameters consisting of an image resolution, a degree of image compression, a frame rate and a bandwidth.

46. The computer program product according to claim 45, wherein controlling the quality comprises eliminating an interval of silent audio data in order to compensate for the delay by marking at least one block of the audio data as a silent block, and eliminating the silent block from the mixed audio data.

47. The computer program product according to claim 46, wherein each of the downlink video packets contains the video data from each respective at least one remote computer.

48. The computer program product according to claim 47 further comprising the steps of:
 receiving and synchronizing the video data with the mixed audio data based on synchronization data from the received synchronization packet; and
 outputting the synchronized video and mixed audio data to a respective user of each of the remote computers wherein outputting the synchronized video and mixed audio data comprises displaying the video data captured by the respective one of the remote computers in a respective window among multiple windows displayed by each of the remote computers.

49. The computer program product according to claim 48, wherein synchronizing the video data comprises controlling the multiple windows so that the video data conveyed from each of the remote computers are synchronized with the mixed audio data.

50. A client computer, comprising:
 a user interface; and
 a processor, which is configured to establish a communication link over a packet network so as to participate in a video teleconference, and to transmit uplink audio packets and uplink video packets, which respectively contain audio and video data,
 wherein the processor is configured to receive downlink audio packets containing the a stream of mixed audio data, to receive synchronization packets containing synchronization information generated, and to receive downlink video packets containing the video data transmitted by other remote computers in the video teleconference, and to synchronize the video data with the mixed audio data based on the synchronization information for output via the user interface.

* * * * *